United States Patent
Ishii et al.

(10) Patent No.: US 8,600,397 B2
(45) Date of Patent: Dec. 3, 2013

(54) MOBILE COMMUNICATION SYSTEM AND COMMUNICATION CONTROLLING METHOD

(75) Inventors: Hiroyuki Ishii, Yokosuka (JP); Takahiro Hayashi, Yokosuka (JP); Akihito Hanaki, Yokohama (JP); Junichiro Kawamoto, Yokohama (JP); Yoshikazu Goto, Yokosuka (JP); Koji Furutani, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1337 days.

(21) Appl. No.: 11/859,431

(22) Filed: Sep. 21, 2007

(65) Prior Publication Data

US 2008/0076442 A1 Mar. 27, 2008

(30) Foreign Application Priority Data

Sep. 22, 2006 (JP) .............................. P2006-258026
Sep. 21, 2007 (JP) .............................. P2007-246278

(51) Int. Cl.
*H04W 72/00* (2009.01)

(52) U.S. Cl.
USPC ........ 455/453; 455/452.1; 455/450; 455/515; 370/328

(58) Field of Classification Search
USPC ........ 455/453, 452.2, 450, 515; 370/329, 328
See application file for complete search history.

(56) References Cited

U.S. PATENT DOCUMENTS

| | | | |
|---|---|---|---|
| 2002/0077113 A1* | 6/2002 | Spaling et al. | 455/453 |
| 2003/0202490 A1* | 10/2003 | Gunnarsson et al. | 370/332 |
| 2004/0242256 A1 | 12/2004 | Xiao et al. | |
| 2006/0068821 A1* | 3/2006 | Rinne | 455/515 |
| 2006/0159013 A1 | 7/2006 | Lee et al. | |
| 2006/0268764 A1* | 11/2006 | Harris | 370/328 |
| 2007/0037581 A1 | 2/2007 | Morita | |

FOREIGN PATENT DOCUMENTS

| | | |
|---|---|---|
| EP | 1 223 771 A1 | 7/2002 |
| JP | 2003-179968 | 6/2003 |
| JP | 2004-236322 | 8/2004 |
| JP | 2006-141038 | 6/2006 |
| WO | WO 98/35522 | 8/1998 |
| WO | WO 01/47288 A2 | 6/2001 |
| WO | WO 2004/019630 A1 | 3/2004 |
| WO | WO 2005/002270 A1 | 1/2005 |
| WO | WO 2006/016212 A1 | 2/2006 |
| WO | WO 2006/075951 A1 | 7/2006 |

OTHER PUBLICATIONS

"$3^{rd}$ Generation Partnership Project", 3GPP TS 25.308, V5.7.0, Dec. 2004, pp. 1-28.
"$3^{rd}$ Generation Partnership Project 2 3GPP2", 3GPP2 C.S0024-A, Version 1.0, Mar. 2004, 1,083 Pages.

(Continued)

*Primary Examiner* — Danh Le
(74) *Attorney, Agent, or Firm* — Oblon, Spivak, McClelland, Maier & Neustadt, L.L.P.

(57) ABSTRACT

The present invention relates to a mobile communication system which includes a base station, a mobile station for performing a communication with the base station, and a radio network controller for controlling the communication between the base station and the mobile station. The mobile communication system comprises a controller configured to control a communication state of the communication between the base station and the mobile station according to a congestion state of an uplink.

11 Claims, 9 Drawing Sheets

(56) References Cited

OTHER PUBLICATIONS

Decision of Refusal issued Apr. 3, 2012 in Japanese patent Application No. 2007-246278 (with English translation).
Office Action issued Nov. 9, 2011 in Chinese Patent Application No. 200710152965.2 (with English translation).
Office Action issued Nov. 22, 2011 in Japanese Patent Application No. 2007-246278 (with English translation).
3$^{rd}$ "Generation Partnership Project", 3GPP TS 25.331 V6.8.0, Annex B (informative): Description of PRC State Transitions, 2005, Release 6, pp. 1136-1139 (with Cover page).

* cited by examiner

FIG. 5

|  | USAGE AMOUNT OF UPLINK BASEBAND RESOURCES |
|---|---|
| CONGESTION LEVEL A | 70%~100% |
| CONGESTION LEVEL B | 30%~70% |
| CONGESTION LEVEL C | 0%~30% |

FIG. 6

|  | UPLINK RECEIVED POWER LEVEL |
|---|---|
| CONGESTION LEVEL A | MORE THAN -70 dBm |
| CONGESTION LEVEL B | MORE THAN -100 dBm BUT LESS THAN -70 dBm |
| CONGESTION LEVEL C | LESS THAN -100 dBm |

FIG. 7

|  | USAGE AMOUNT OF UPLINK BASEBAND RESOURCES |
|---|---|
| CONGESTION LEVEL A → CONGESTION LEVEL B | MORE THAN 70% |
| CONGESTION LEVEL B OR C → CONGESTION LEVEL A | MORE THAN 80% |
| CONGESTION LEVEL A OR B → CONGESTION LEVEL C | MORE THAN 50% |
| CONGESTION LEVEL C → CONGESTION LEVEL B | MORE THAN 60% | ps
MOBILE COMMUNICATION SYSTEM AND COMMUNICATION CONTROLLING METHOD

CROSS REFERENCE TO RELATED APPLICATION

This application is based upon and claims the benefit of priority from prior Japanese Patent Application P2006-258026 filed on Sep. 22, 2006; and Japanese Patent Application P2007-246278 filed on Sep. 21, 2007; the entire contents of which are incorporated by reference herein.

BACKGROUND OF THE INVENTION

1. Field of the Invention

The present invention relates to a mobile communication system and a communication controlling method.

2. Description of the Related Art

In a mobile communication system, a communication is performed by using limited resources (frequency and power), and an upper limit on a capacity of the communication is set. Accordingly, an increase of the number of users (the number of mobile stations) who perform the communication in the mobile communication system causes a problem of deteriorating a communication quality of the communication which has been already performed, or a problem that it is not allowed to newly start a communication. This situation is generally called a congestion state.

In addition, in the mobile communication system, in general, priority classes, service types and contract types are provided. Therefore communication services have to be provided in consideration of the priority classes, the service types and the contract types.

More specifically, under the congestion state, the communication quality has to be controlled in consideration of the priority classes, the service types and the contract types. Note that, under a non-congestion state, the communication quality does not have to be controlled seriously, because there seems to be enough resources in the mobile communication system.

For example, a mobile station belonging to the first priority class and a mobile station belonging to the second priority class, which is lower priority than the first priority class, are provided in the mobile communication system. In this case, the mobile station belonging to the second priority class should be treated a lower priority the mobile station belonging to the first priority class.

Meanwhile, the third generation mobile communication system, so-called IMT-2000, has been standardized in 3GPP/3GPP2 (Third-Generation Partnership Project/Third-Generation Partnership Project 2) organized by such as regional standards groups. Precisely, 3GPP defines the standard specifications for the W-CDMA scheme, while 3GPP2 defines the standard specifications for the cdma2000 scheme.

Along with the recent rapid spread of the Internet, 3GPP predicts that high-speed and high-capacity traffic will increase, particularly in a downlink, due to such as downloads from databases and Web sites. Based on this prediction, 3GPP has standardized the specifications of "HSDPA (High Speed Downlink Packet Access)" that is a high-speed downlink packet transmission scheme (for example, see 3GPP TS25.308 v5.7.0).

In addition, from the same point of view, 3GPP2 also standardizes the specifications of "1x-EV DO" that is a high-speed downlink transmission scheme only for data (for example, see 3GPP2 C. S0024 Rev. 1.0.0). Incidentally, DO in cdma2000 1x-EV DO stands for data only.

More detailed explanation for HSDPA is provided below.

HSDPA is a system in which a plurality of mobile stations perform the communication by sharing a single shared channel. In HSDPA, every time transmission interval (TTI, 2 ms in the case of HSDPA), a base station selects one of the plurality of mobile stations, which is to use the shared channel, and transmits packets to the selected mobile station. It is called as scheduling that the base station selects a mobile station which is to use the shared channel every TTI.

"Round Robin Scheduler" is widely known as a scheduling algorithm in a radio base station. The "Round Robin Scheduler" controls the transmission order of packets waiting for transmission, by assigning the downlink shared channel sequentially to mobile stations (for example, mobile stations #1 to #2 to #3 . . . ) which belong to the radio base station.

Moreover, "Proportional Fairness Scheduler" and "Max C/I (Maximum C/I) Scheduler" are known as scheduling algorithms in a radio base station. The "Proportional Fairness Scheduler" and the "Max C/I Scheduler" control the transmission order of packets waiting for transmission based upon the radio condition of each mobile station and the average transmission rate of packets to each mobile station.

For example, the proportional fairness scheduler performs the scheduling by which an evaluation function, $$C_n = \frac{R_n}{\overline{R}_n}$$

(where $R_n$ denotes an instantaneous radio condition of each mobile station, and $\overline{R}_n$ denotes an average transmission rate of each mobile station) is calculated for each mobile station, and by which the shared channel is assigned to a mobile station having the greatest value of the evaluation function $C_n$.

Here, by adding a factor A showing priority classes to the evaluation function, the proportional fairness scheduling in consideration of the priority classes can be provided. More precisely, by using $$C_n = A \cdot \frac{R_n}{\overline{R}_n}$$

as the evaluation function $C_n$ instead of $$C_n = \frac{R_n}{\overline{R}_n},$$

the proportional fairness scheduling in consideration of the priority classes can be provided.

In other words, in the mobile communication system providing the communication using HSDPA, as for downlink, use of the factor A showing priority classes makes it possible to provide communications in consideration of the aforementioned priority classes, the service types and the contract types.

BRIEF SUMMARY OF THE INVENTION

As for uplink, however, it is difficult to provide a communication in consideration of the priority classes, the service types and the contract types.

As described above, the communication quality in the mobile communication system under the congestion state has to be controlled in consideration of the priority classes, the service types and the contract types.

As described above, in the mobile communication system that provides communication services by using the HSDPA scheme in 3GPP, the scheduling by using the factor A showing priority classes is provided as the communication quality controlling method. However, there is a problem that this communication quality controlling method is applicable only to downlink, and is not applicable to uplink.

Accordingly, in view of the above-described problem, an object of the present invention is to provide a mobile communication system and a communication controlling method for appropriately providing mobile communication services by controlling whether or not to change a communication state or whether or not to admit to newly start a communication, according to the congestion state of an uplink.

To achieve the above-described object, a first aspect of the invention is summarized as a mobile communication system which includes a base station, a mobile station for performing a communication with the base station, and a radio network controller for controlling the communication between the base station and the mobile station, comprising: a controller configured to control a communication state of the communication between the base station and the mobile station according to a congestion state of an uplink.

In the first aspect of the present invention, the controller may be configured to classify the congestion state of the uplink into a plurality of congestion levels, and to control the communication state between the base station and the mobile station for each of the plurality of congestion levels.

In the first aspect of the present invention, the congestion state of the uplink may be determined based on at least one of a usage amount of a baseband resource of the base station and a received power level of the base station.

In the first aspect of the present invention, the controlling of the communication state between the base station and the mobile station may be to change at least one of an uplink transmission rate and a downlink transmission rate.

In the first aspect of the present invention, the controlling of the communication state between the base station and the mobile station may be to set the communication state between the base station and the mobile station to at least one of an idle state, an active state, a cell_fach state, a cell_dch state, a common channel state, a dedicated channel state and a high-speed shared channel state.

In the first aspect of the present invention, the controlling the communication state between the base station and the mobile station may be to keep the communication state between the base station and the mobile station unchanged, when the communication state between the base station and the mobile station is any one of an idle state, an active state, a cell_fach state, a cell_dch state, a common channel state, a dedicated channel state and a high-speed shared channel state.

In the first aspect of the present invention, the controlling of the communication state between the base station and the mobile station may be to control whether or not to admit to newly start a communication between the base station and the mobile station.

In the first aspect of the present invention, the base station and the mobile station may perform the communication with each other in a downlink by using a high speed downlink packet access.

In the first aspect of the present invention, the base station and the mobile station may perform the communication with each other in the uplink by using any one of a high speed uplink packet access and an enhanced uplink.

In the first aspect of the present invention, the controller may be configured to control the communication state according to any of a priority class, a service type, a contract type, a terminal type and a user identifier.

In the first aspect of the present invention, the controller may be configured to control the communication state of the mobile station which has been performing the communication for a period longer than a certain threshold.

a second aspect of the invention is summarized as a communication controlling method in a mobile communication system which includes of a base station, a mobile station for performing a communication with the base station, and a radio network controller for controlling the communication between the base station and the mobile station, comprising-controlling a communication state of the communication between the base station and the mobile station according to a congestion state of an uplink.

BRIEF DESCRIPTION OF THE SEVERAL VIEWS OF THE DRAWINGS

FIG. 5 is a table showing relationships between usage amounts of baseband resources and congestion levels in an uplink according to this embodiment (Table No. 1).

FIG. 6 is a table showing relationships between received signal levels and congestion levels in an uplink according to this embodiment.

FIG. 7 is a table showing relationships between usage amounts of baseband resources and congestion levels in an uplink according to this embodiment (Table No. 2).

DETAILED DESCRIPTION OF THE INVENTION

Figure 1:
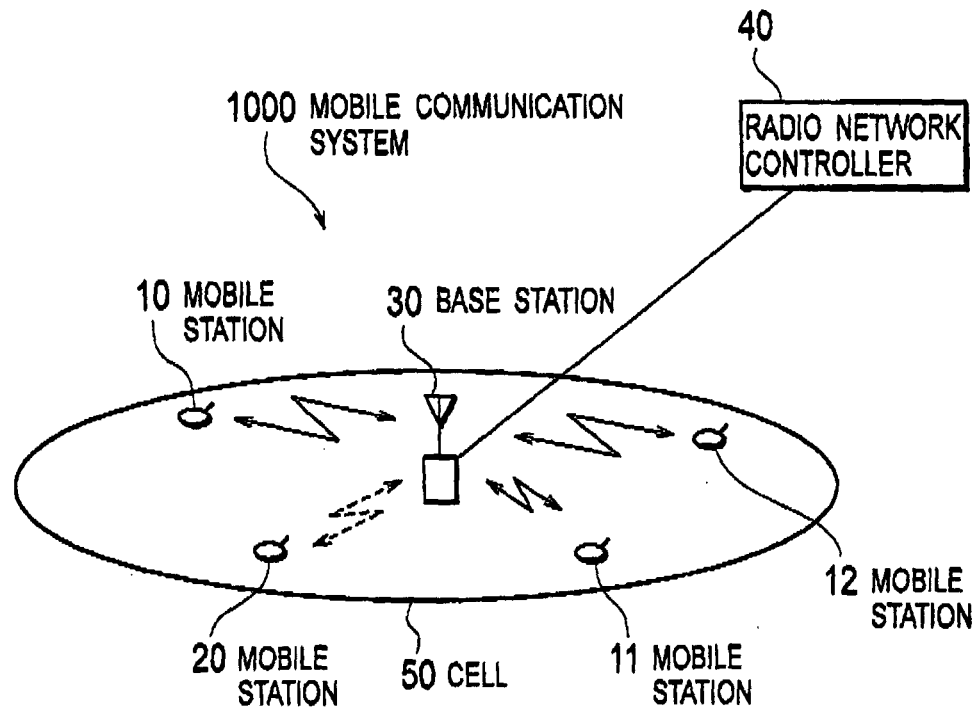
FIG. 1 is a functional block diagram showing a configuration example of a mobile communication system according to an embodiment.

Hereinafter, embodiments of the present invention will be described by referring to the drawings. In the following description of the drawings, the same or similar reference numerals are given to the same or similar elements. Moreover, it should be noted that the drawings are only schematic ones.

(Configuration of Mobile Communication System)

FIG. 1 is a diagram showing a configuration example of a mobile communication system to which a communication controlling method of an embodiment of the present invention is applied.

In FIG. 1, the mobile communication system 1000 is configured with a plurality of mobile stations 10, 11, 12 and 20, a base station 30, a radio network controller 40 controlling the mobile stations 10, 11, 12 and 20 and the base station 30. Further, the mobile communication system 1000 employs aforementioned HSDPA in downlink.

A cell 50 indicates an area in which the base station 30 can perform communications. Here, in the cell 50, the mobile stations 10, 11, 12, . . . are performing the communication with the base station 30. Moreover, in the cell 50, the mobile station 20 is about to newly start a communication with the base station 30.

In the following description, the mobile stations 10, 11, 12, . . . have same configuration, functions and states. Therefore they are described as a mobile station n (n≥1) unless otherwise specified. In addition, the mobile station 20 is used as an example of a mobile station that is about to newly start the communication.

Here, communication channels in HSDPA are described below. In the downlink in HSDPA, a physical downlink shared channel HS-PDSCH (High Speed-Physical Downlink Shared Channel, HS-DSCH: High Speed Downlink Shared Channel as a transport channel) shared by the mobile stations 10 to 12; and a downlink shared control channel HS-SCCH (High Speed-shared Control Channel) shared by the mobile stations 10 to 12; and a downlink associated dedicated channel A-DPCH (Associated-Dedicated Physical Channel) dedicatedly assigned to each of the mobile stations, are used.

Moreover, in the uplink, in addition to an uplink associated-dedicated channel A-DPCH dedicatedly assigned to each of the mobile stations, a dedicated control channel for HSDPA HS-DPCCH (High Speed-Dedicated Physical Control Channel) dedicatedly assigned to each of the mobile stations.

Then, in the downlink, a transmission power control command for the uplink associated-dedicated channel and the like are transmitted on the downlink associated-dedicated channel, and user data are transmitted on the shared physical channel.

On the other hand, in the uplink, in addition to the user data, a pilot symbol and a transmission power control command (TPC command) for the downlink associated-dedicated channel are transmitted on the uplink associated-dedicated channel. Moreover, downlink quality information used for scheduling of the shared channel and for implementing the adaptive modulation and coding scheme (AMCS), and transmission acknowledgement information of the downlink shared channel HS-DSCH are transmitted on the dedicated control channel for HSDPA in the uplink (HS-DPCCH).

Here, the uplink associated-dedicated channel A-DPCH is the same as a usual dedicated channel DPCH. For example, the transmission rates of the uplink associated-dedicated channels A-DPCH are 32 kbps, 64 kbps, 384 kbps and so on.

Figure 2:
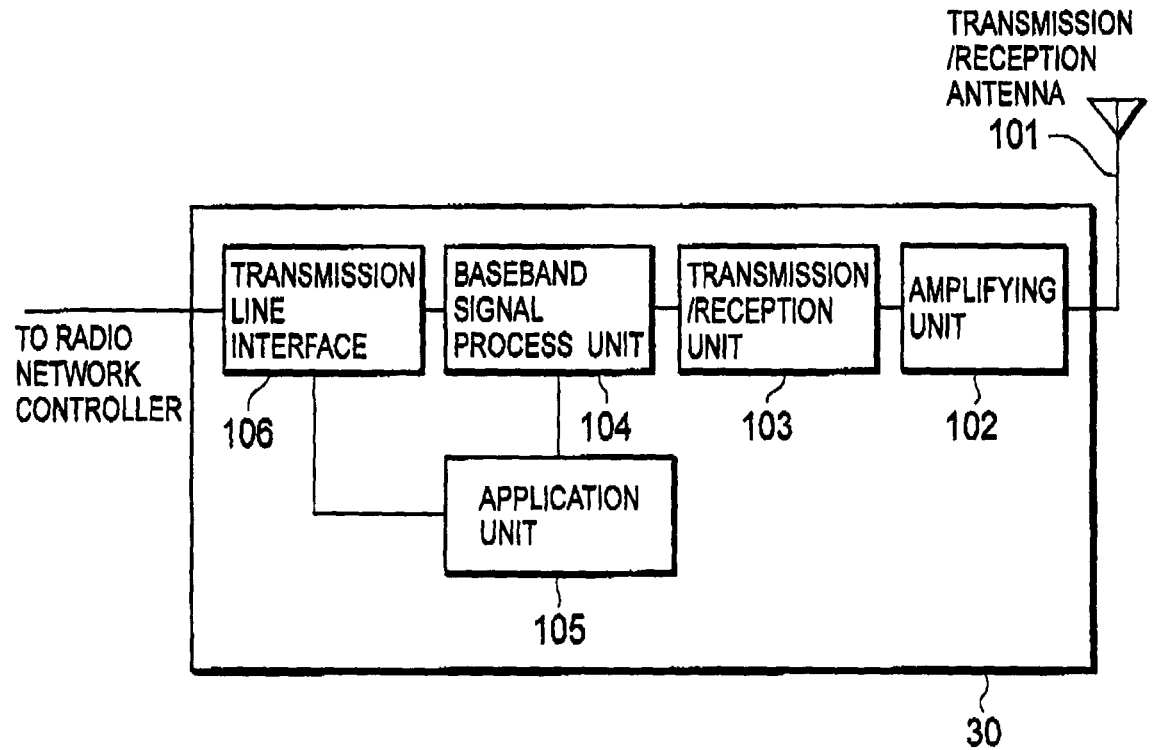
FIG. 2 is a functional block diagram showing a configuration example of a base station according to this embodiment.

FIG. 2 is a functional block diagram showing a configuration example of the base station 30 of FIG. 1.

In FIG. 2, the base station 30 includes a transmission/reception antenna 101, an amplifying unit 102, a transmission/reception unit 103, a baseband signal process unit 104, an application unit 105 and a transmission line interface 106.

Packet data of a downlink is inputted to the baseband signal process unit 104 through the transmission line interface 106 from the radio network controller 40 controlling the base station 30.

The baseband signal process unit 104 performs, on the inputted packet data, a retransmission control (Hybrid ARQ (H-ARQ)) processing, a scheduling processing, a transmission format selection processing, and channel coding processing and spreading processing, and then transfers the packet data as a baseband signal to the transmission/reception unit 103.

The transmission/reception unit 103 performs frequency conversion processing to convert the frequency of the baseband signal, which is outputted from the baseband signal process unit 104, to the radio frequency band. Thereafter, the converted radio frequency band is amplified by the amplifying unit 102 and transmitted by the transmit-receive antenna 101.

On the other hand, as for data of an uplink, a radio frequency signal received by the transmission/reception antenna 101 is amplified by the amplifying unit 102, and then is converted into a baseband signal by the transmission/reception unit 103 through a frequency conversion.

The baseband signal is performed through despreading processing, RAKE combining processing and error correcting decoding processing, and then is transferred to the radio network controller 40 through the transmission line interface 106.

Moreover, as will be described later, the received power level of in the base station 30 is measured based on the baseband signal transmitted in the uplink.

Figure 3:
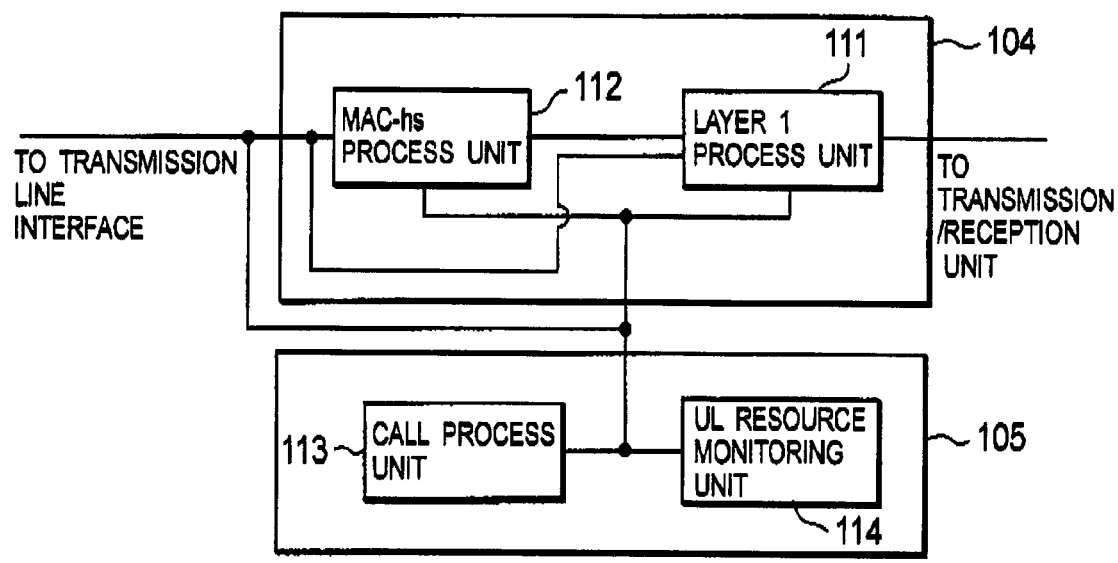
FIG. 3 is a functional block diagram showing configuration examples of a baseband signal process unit and an application unit shown in FIG. 2.

FIG. 3 is a functional block diagram showing functional configurations of the baseband signal process unit 104 and the application unit 105.

In FIG. 3, the baseband signal process unit 104 includes a layer 1 process unit 111 and a MAC-hs (this stands for Medium Access Control-HSDPA) process unit 112. The application unit 105 includes a call process unit 113 and an UL resource monitoring unit 114. The layer 1 process unit 111 and the MAC-hs process unit 112 in the baseband signal process unit 104 are connected to each of the call process unit 113 and the UL resource monitoring unit 114 in the application unit 105.

The layer 1 process unit 111 performs the channel coding processing of downlink data, the channel decoding processing of uplink data, the transmission power control processing for downlink and uplink dedicated channels, the RAKE combining processing, and the spreading and despreading processing.

Moreover, the layer 1 process unit 111 measures a usage amount of baseband resources in the uplink (also called the uplink baseband resources, below), and notifies the UL resource monitoring unit 114 of the usage amount. Here, the usage amount of baseband resources indicates a physical memory amount and computational processing ability, for example.

In addition, the layer 1 process unit 111 measures the uplink received power level, and notifies the UL resource monitoring unit 114 of the uplink received power level. Here, the received power level includes, for example, the received total wide band power (RTWP) and the rise-overthermal (RoT).

Incidentally, although the baseband signal process unit 104 measures the uplink received power level in this embodiment, another functional unit, for example, the transmission/reception unit or the amplifying unit may measure the uplink received power level. Instead, another functional unit having the same function as a power meter may be provided to the base station 30, and may measure the uplink received power level.

The MAC-hs process unit 112 performs HARQ (Hybrid ARQ) processing for the downlink shared channel in HSDPA, scheduling processing of packets waiting for transmission, and a determination processing of a transmission format of the downlink shared channel in the AMCS.

The processing in the layer 1 process unit 111 and the MAC-hs process unit 112 is performed based on a communication state of the communication between the base station 30 and the mobile station n, the communication state being set in the call process unit 118.

The call process unit 113 receives and transmits a call processing control signal from and to the radio network controller 40. Further the call process unit 113 performs a control of the communication state of the base station 30, and a resource allocation to the base station 30.

For example, when the mobile terminal n is performing a communication in which best effort using HSDPA in the downlink and 64 kbps in the uplink are employed, the call process unit 118 may be instructed, from the radio network controller 40, to change the communication state of the mobile terminal n to a communication in which best effort in the downlink and 32 kbps in the uplink are employed.

In this case, the call process unit 113 changes the communication state of the mobile station n from the communication in which best effort using HSDPA in the downlink and 64 kbps in the uplink are employed, to the communication in which best effort using HSDPA in the downlink and 32 kbps in the uplink are employed.

In addition, for example, when the mobile terminal n is performing the communication in which best effort using HSDPA in the downlink and 64 kbps in the uplink are employed, the call process unit 113 is instructed, from the radio network controller 40, to change the communication state of the mobile station n to a communication of a CELL_FACH state (a cell_fach state) in which a FACH (Forward Access channel) in the downlink and a RACH (Random Access channel) in the uplink are employed.

In this case, the call process unit 113 changes the communication state of the mobile station n from the communication in which best effort using HSDPA in the downlink and 64 kbps in the uplink are employed, to the communication of a CELL_FACH state in which a FACH in the downlink and a RACH in the uplink are employed.

The UL resource monitoring unit 114 receives, from the layer 1 process unit 111, the usage amount of uplink baseband resources and the uplink received power level, and notifies the radio network controller 40 of the usage amount of uplink baseband resources and the uplink received power level.

Figure 4:
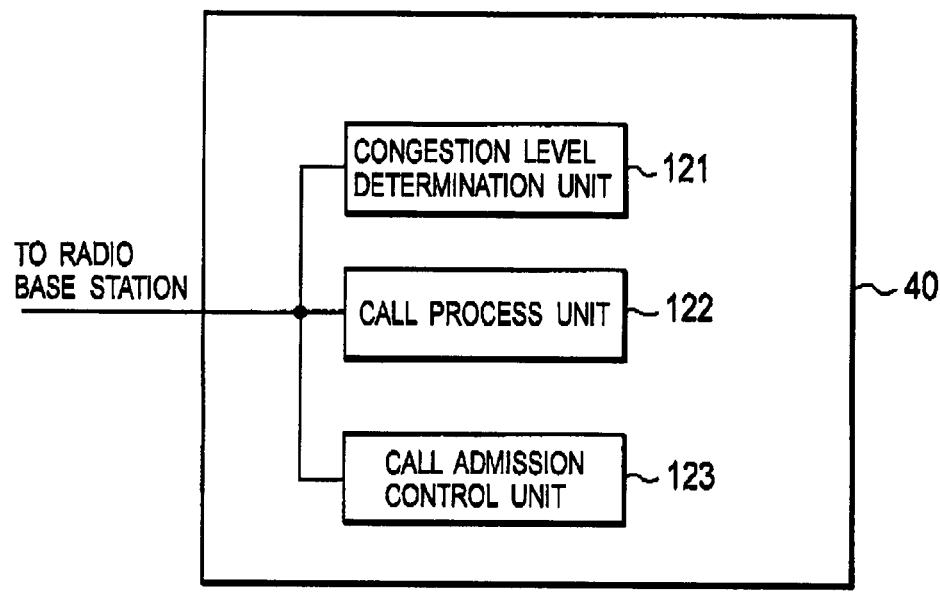
FIG. 4 is a functional block diagram showing a configuration example of a radio network controller according to this embodiment.

FIG. 4 is a functional block diagram showing a functional configuration of the radio network controller 40. FIG. 4 only shows functional units related to the communication controlling method according to the present invention among functional units of the radio network controller 40, while omitting the other functional units.

The radio network controller 40 includes a congestion level determination unit 121 (controller), a call process unit 122 (controller) and a call admission control unit 123 (controller). The congestion level determination unit 121, the call process unit 122 and the call admission control unit 128 are connected to each other, and are also connected to the base station 30. More precisely, the congestion level determination unit 121, the call process unit 122 and the call admission control unit 128 are connected to the call process unit 113 and the UL resource monitoring unit 114 in the base station 30.

The congestion level determination unit 121 receives the usage amount of uplink baseband resources and the uplink received power level from the UL resource monitoring unit 114 in the base station 30, and determines the congestion level based on the usage amount of uplink baseband resources and the uplink received power level.

For example, the congestion level determination unit 121 may hold a table concerning the usage amount of uplink baseband resources, as shown in FIG. 5, and may determine the congestion level in reference to the usage amount of uplink baseband resources and the table. In the table shown in FIG. 5, congestion levels A, B and C are set as the congestion levels. Incidentally, although the usage amounts of uplink baseband resources are written as relative values in the table shown in FIG. 5, absolute values may also be used.

Moreover, for example, the congestion level determination unit 121 may hold a table concerning the uplink received power level, as shown in FIG. 6, and may determine the congestion level in reference to the uplink received power level and the table. In the table shown in FIG. 6, congestion levels A, B and C are set as the congestion levels. Incidentally, although the uplink received power levels are written as absolute values in the table shown in FIG. 6, relative values may also be used. In this case, a reference power level is determined, and then the relative values are each defined as a value relative to the reference power level.

Here, the congestion level determination unit 121 may determine the congestion level based on either the usage amount of uplink baseband resources, or the uplink received power level.

Moreover, the congestion level determination unit 121 may determine the congestion level by selecting a higher or lower one between the congestion level determined based on the usage amount of uplink baseband resources and the congestion level determined based on the uplink received power level. Here, in the foregoing example, the congestion levels are assumed to have a relationship of the congestion level A>the congestion level B>the congestion level C.

Further, the congestion level determination unit 121 may employ a certain hysteresis to the congestion level determined by using the tables shown in FIGS. 5 and 6. For example, the congestion level determination unit 121 may use a table as shown in FIG. 7, when the congestion level is determined based on the usage amount of uplink baseband resources.

Subsequently, the congestion level determination unit 121 notifies the call process unit 122 and the call admission control unit 123 of the congestion level determined as described above.

The call process unit 122 receives the congestion level from the congestion level determination unit 121. Then, the call process unit 122 controls the communication state of the mobile station n according to the congestion level.

Here, the controlling of the communication state means that the state of the communication between the base station and the mobile station is set to at least one of an idle state, an active state, a CELL_FACH state, a CELL_DCH state (a cell_dch state), a common channel state, a dedicated channel state and a high-speed shared channel state.

Alternatively, the controlling of the communication state may also mean that the state of the communication between the base station and the mobile station is kept unchanged when the state of the communication between the base station and the mobile station is any one of the idle state, and the active state, the CELL_FACH state, the CELL_DCH state, the common channel state, the dedicated channel state and the high-speed shared channel state.

Further, an idle state is a state in which a location registration of the mobile station has already been completed but a communication channel has not been established in the mobile communication system. An active state is a state in which a communication channel has already been established between the mobile station and the base station or the control station.

Here, the active state includes a common channel state, a dedicated channel state and a high-speed shared channel state. The common channel state included in the active state is a state performing a communication in which FACH in the downlink and RACH in the uplink are employed, as the CELL_FACH state described below. The dedicated channel state included in the active state is a state performing a communication in which DCH (Dedicated Channel) in both the uplink and the downlink are employed, and is a kind of the CELL_DCH state described below. The high-speed shared channel state included in the active state is a state performing a communication in which HS-DSCH in the downlink and DCH in the uplink are employed, and is a kind of the CELL_LDCH state described below.

In addition, the controlling of the communication state may also mean to control whether or not to admit to newly start a communication between the base station and the mobile station.

In addition, the controlling of the communication state may also mean to change at least one of an uplink transmission rate and a downlink transmission rate.

For example, when the congestion level is the congestion level B and the mobile station n is performing the communication in which best effort using HSDPA in the downlink and 64 kbps in the uplink are employed, the call process unit 122 may determine to change the communication state of the mobile station n to the communication in which best effort using HSDPA in the downlink and 32 kbps in the uplink are employed, that is, the call process unit 122 may determine to decrease the uplink transmission rate. Then, the call process unit 122 may notify the determined change to the call process unit 113 in the base station 30 and the mobile station.

Alternatively, for example, when the congestion level is the congestion level A, and the mobile station n is performing the communication in which best effort using HSDPA in the downlink and 64 kbps in the uplink are employed, the call process unit 122 may determine to change the communication state of the mobile station n to the communication of CELL_FACH state in which FACH in the downlink and RACH in the uplink are employed, that is, the call process unit 122 may determine to change to the state in which the communication is performed by the decreased transmission rate. Thereafter, the call process unit 122 may notify the determined change to the call process unit 113 in the base station 30 and the mobile station. Here, according to the above-described change of the communication state, both uplink transmission rate and downlink transmission rate are decreased.

Note that, the call process unit 122 may perform the aforementioned change of the communication state according to the priority classes of the mobile stations 10, 11, 12, which are performing the communication in the cell 50.

For example, when there are mobile stations belonging to a first priority class and mobile stations belonging to a second priority class, and when the mobile stations belonging to the first priority class has a higher priority than the mobile stations belonging to the second priority class, the call process unit 122 may apply the aforementioned change of the communication state only to the mobile stations belonging to the second priority class.

Instead, the call process unit 122 may apply the aforementioned change of the communication state only to some of the mobile stations which belong to the second priority class and have been performing the communication for a period longer than a predetermined period. For example, when the mobile stations 10, 11, 12 and 13 belong to the second priority class and have been performing the communication for 3 minutes, 5 minutes, 10 minutes and 14 minutes, respectively, the call process unit 122 may apply the aforementioned change of the communication state to only two mobile stations having the first and second longest communication period. In this case, the communication state of the mobile stations 12 and 13 are changed as described above.

Alternatively, the call process unit 122 may perform the aforementioned change of the communication state according to the contract type of the mobile station, which is performing the communication in the cell 50.

For example, when there are mobile stations subscribing a contract of high charge and mobile stations subscribing a contract of low charge, the call process unit 122 may apply the aforementioned change of the communication state only to the mobile stations subscribing the contract of low charge.

Instead, the call process unit 122 may apply the aforementioned change of the communication state only to some of the mobile stations which subscribe the contract of low charge and have been performing the communication for a period longer than a predetermined period. For example, when the mobile stations 10, 11, 12 and 13 subscribes the contract of low charge, and have been performing the for 8 minutes, 5 minutes, 10 minutes and 14 minutes, respectively, the call process unit 122 may apply the aforementioned change of the communication state to only one mobile station having the longest communication period. In this case, the communication state of the mobile station 13 is changed as described above.

Alternatively, the call process unit 122 may perform the aforementioned change of the communication state according to the service type of the mobile stations 10, 11, 12, . . . , which are performing the communication in the cell 50.

For example, when there are mobile stations provided with a Voice over IP (VoIP) service and mobile stations provided with a best effort packet communication service, the call process unit 122 may apply the aforementioned change of the communication state only to the mobile stations provided with the best effort packet communication service.

Instead, the call process unit 122 may apply the aforementioned change of the communication state only to some of the mobile stations which are provided with the best effort packet communication service and have been performing the communication for a period longer than a predetermined period. For example, when the mobile stations 10, 11, 12 and 13 are provided with the best effort packet communication service, and have been performing the communication for 3 minutes, 5 minutes, 10 minutes and 14 minutes, respectively, the call process unit 122 may apply the aforementioned change of the communication state to only one mobile station having the longest communication period. In this case, the communication state of the mobile station 18 is changed as described above.

Alternatively, the call process unit 122 may apply the aforementioned change of the communication state not only according to the priority classes, contract types or service types but also according to terminal types or user identifiers.

Here, the terminal types are used to classify the capability of a mobile station to which packets are transmitted in the downlink, and include: a class based on the identification information of a mobile station; the presence/absence or a type of a RAKE receiver function, an equalizer, a reception diversity, an interference canceller or the like; and a terminal capability such as a receivable modulation scheme, the number of receivable codes or bits or the like.

In addition, the user identifiers indicate, for example, the identification information of a mobile station or an identifier based on a user's contract ID.

Moreover, the call process unit 122 may perform the aforementioned change of the communication state every certain time period, for example. The call process unit 122 can be set so as to change the communication states of two mobile stations every minute, for example.

In general when data to be transmitted in the uplink or downlink appears, the radio network controller 40 changes the communication state of the mobile station from the CELL_FACH state to the CELL_DCH state. Here, the CELL_FACH state (cell_fach state) is a state performing a communication in which FACH in the downlink and RACH in the uplink are employed. The CELL_DCH state (cell_dch state) is a state performing a communication in which HS-DSCH in the downlink and DCH in the uplink are employed (CELL_DCH state using HSDPA, i.e. the above-described high-speed shared channel state), or is a state performing a communication in which DCH in both the downlink and the uplink are employed (CELL_DCH state using a dedicated channel, i.e. the above-described dedicated channel state).

Here, for example, when the congestion level is the congestion level A, the call process unit 122 may determine not to perform the aforementioned change of the communication state of the mobile station from the CELL_FACH state to the CELL_DCH state using HSDPA. At this time, the call process unit 122 may determine to change from the CELL_FACH state to the CELL_DCH state using a dedicated channel, instead of changing from the CELL_FACH state to the CELL_DCH state using HSDPA. Alternatively, the call process unit 122 may determine not to perform the aforementioned change of the communication state of the mobile station from the CELL_FACH state to the CELL_DCH state using HSDPA, and not do any processing. At this time, the mobile station is kept in the CELL_FACH state.

Instead, in general, the radio network controller 40 sometimes changes the transmission rate in the uplink according to such as data amount in the transmission buffer of the mobile station n. For example, when the data amount in the transmission buffer of the mobile station exceeds a certain threshold value, the radio network controller 40 performs processing of changing the transmission rate in the uplink from 32 kbps to 64 kbps. Here, for example, when the congestion level is the congestion level A, the call process unit 122 may determine not to perform the aforementioned change of the transmission rate in the uplink.

Note that the call process unit 122 may determine, according to the priority classes, contract types, service types, terminal types, user identifiers or the like, not to perform the aforementioned change from the CELL_FACH state to the CELL_DCH state and not to change the transmission rate in the uplink.

The call admission control unit 123 receives the congestion level from the congestion level determination unit 121. Then, the call admission control unit 123 determines whether or not to admit the mobile station 20 to newly start a communication.

For example, when the congestion level is the congestion level A, the call admission control unit 123 may determine not to allow the mobile station 20 to newly start a communication, that is, not to admit the mobile station 20 to newly start a communication.

Further, according to the priority class of the mobile station 20, the call admission control unit 123 may determine whether or not to admit to newly start a communication as described above. For example, when there are mobile stations belonging to the first priority class and mobile stations belonging to the second priority class, and when the mobile stations belonging to the first priority class has a higher priority than the mobile stations belonging to the second priority class, the call admission control unit 123 may determine not to admit the mobile station 20 to newly start a communication only when the mobile station 20 belongs to the second priority class.

Alternatively, the call admission control unit 123 may determine whether or not to admit to newly start a communication, according to the contract type of the mobile station 20. For example, when there are mobile stations subscribed on a contract of high charge and mobile stations subscribed on a contract of low charge, the call admission control unit 123 may determine not to admit the mobile station 20 to newly start a communication only when the mobile station 20 is subscribed on the contract of low charge.

Instead, according to a service type of the mobile station 20, the call admission control unit 123 may determine whether or not to admit the mobile station 20 to newly start a communication. For example, when there are mobile stations provided with a Voice over IP (VoIP) service and mobile stations provided with a best effort packet communication service, the call admission control unit 123 may determine not to admit the mobile station 20 to newly start a communication only when the service provided to the mobile station 20 is the best effort packet communication service.

Otherwise, the call admission control unit 123 may determine whether or not to admit to newly start a communication, not only according to the foregoing priority classes, contract types or service types, but also according to terminal types or user identifiers.

Here, the terminal types are used to classify the capability of a mobile station to which packets are transmitted in the downlink, and include: a class based on the identification information of a mobile station; the presence/absence or a type of a RAKE receiver function, an equalizer, a reception diversity, an interference canceller or the like; and a terminal capability such as a receivable modulation scheme, the number of receivable codes or bits or the like.

In addition, the user identifiers indicate the identification information on a mobile station or an identifier based on a user's contract ID, for example.

When determining to admit the mobile station 20 to newly start a communication using HSDPA in the downlink, the call admission control unit 123 performs the processing by which the mobile station 20 starts the communication using HSDPA in the cell 50. More precisely, the call admission control unit 123 transmits a control signal for starting the communication to the base station 30 and the mobile station 20, and performs a setting for the communication.

On the other hand, when determining to prohibit the mobile station 20 from newly starting the communication using HSDPA in the downlink, the call admission control unit 128 does not perform the processing by which the mobile station 20 starts the communication using HSDPA in the cell 50. In this case, for example, the call admission control unit 123 may perform the processing by which the mobile station 20 starts the communication using a dedicated channel in the downlink, instead of the communication using HSDPA in the cell 50.

Otherwise, the call admission control unit 128 may notify the mobile station 20 of the information that the mobile station 20 is prohibited from starting the communication using HSDPA, instead of performing the processing for starting the communication using HSDPA in the downlink. In this case, the communication that the mobile station 20 is about to start becomes a call loss.

Note that, although the communication controlling method according to the present invention is implemented in the base station 30 and the radio network controller 40 as described above, the way of assigning the functions is not limited to the foregoing example. In other words, a part of the foregoing function of the base station 30 can be implemented in the radio network controller 40, or a part of the foregoing function of the radio network controller 40 can be implemented in the base station 30.

For example, in the above-described example, the base station 30 notifies the radio network controller 40 of the usage amount of uplink baseband resources and the uplink received power level. Then the network controller 40 determines the congestion level and controls the communication state between the mobile station and the base station based on the congestion level.

However, instead of the above-described example, the base station 30 may determines the congestion level based on usage amount of uplink baseband resources and the uplink received power level and notify the radio network controller 40 of the determined congestion level. Then the network controller 40 may control the communication state between the mobile station and the base station based on the congestion level notified from the base station 30.

(Communication Controlling Method)

Hereinafter, by use of a flowchart shown in FIG. 8, descriptions will be provided for an operation of communication control for changing the communication state according to the congestion level, in the communication controlling method of this embodiment.

Figure 8:
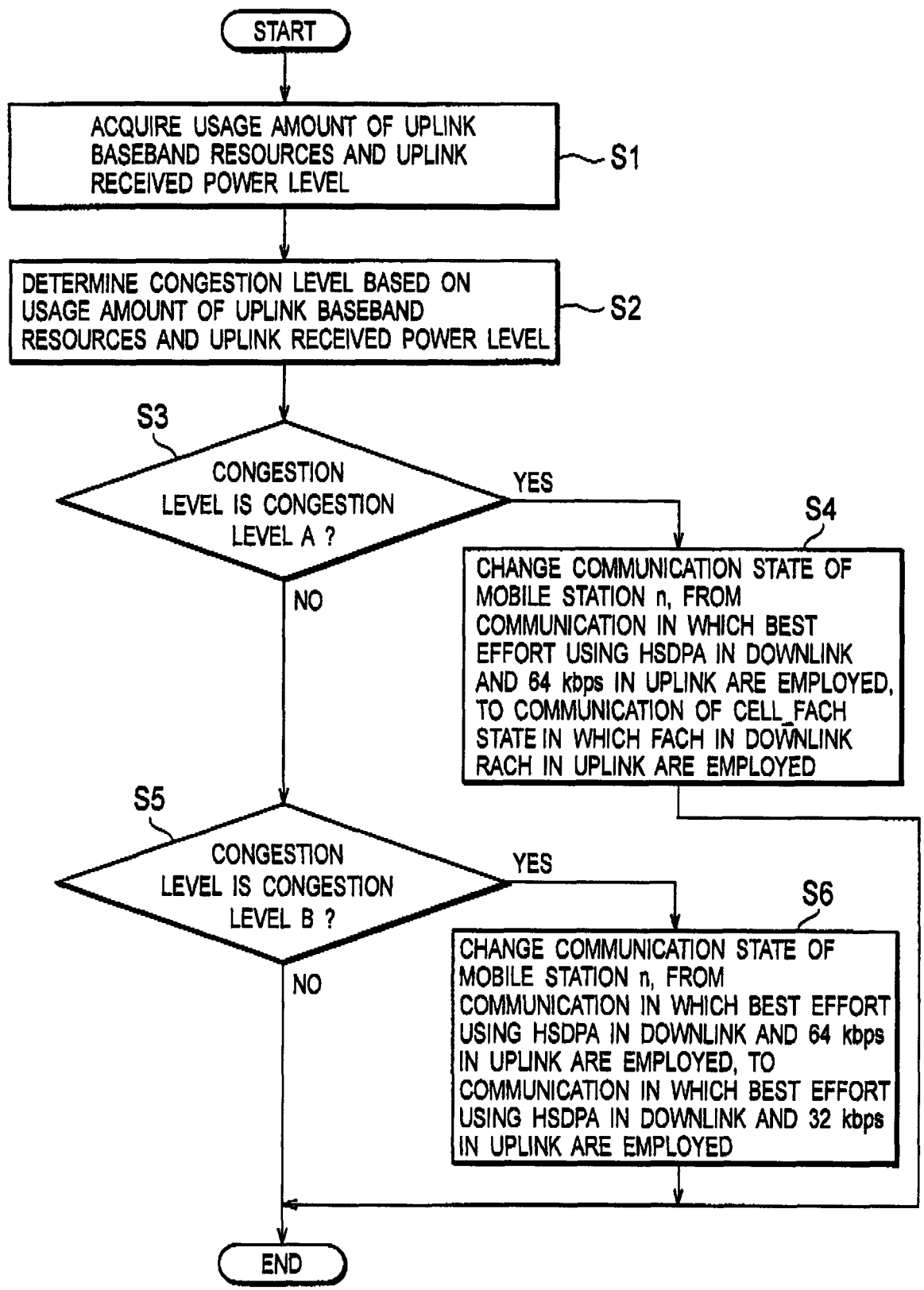
FIG. 8 is a flowchart of communication controlling operations for changing a communication state according to the congestion level in this embodiment.

As shown in FIG. 8, in step S1, the layer 1 process unit 111 and the UL resource monitoring unit 114 in the base station 30 acquire the usage amount of uplink baseband resources and the uplink received power level.

Subsequently, in step S2, the congestion level determination unit 121 in the radio network controller 40 determines the congestion level based on the usage amount of uplink baseband resources and the uplink received power level.

Next, in step S3, the call process unit 122 in the radio network controller 40 determines whether or not the congestion level is the congestion level A. When it is determined that the congestion level is the congestion level A, the operation moves to step S4. When it is determined that the congestion level is not the congestion level A, the operation moves to step S5.

In step S4, the call process unit 122 determines to change the communication state of the mobile station n from the communication in which best effort using HSDPA in the downlink and 64 kbps in the uplink are employed, to the communication of the CELL_FACH state in which FACH in the downlink and RACH in the uplink are employed. Thereafter, the call process unit 122 performs processing of changing the communication state as determined above. Here, according to the above-described change of the communication state, both uplink transmission rate and downlink transmission rate are decreased.

In step S5, the call process unit 122 determines whether or not the congestion level is the congestion level B. When it is determined that the congestion level is the congestion level B, the operation moves to step S6. When it is determined that the congestion level is not the congestion level B, the operation is terminated.

In step S6, the call process unit 122 determines to change the communication state of the mobile station n from the communication in which best effort using HSDPA in the downlink and 64 kbps in the uplink are employed, to the communication in which best effort using HSDPA in the downlink and 32 kbps in the uplink are employed, that is, the call process unit 122 may determine to decrease the uplink transmission rate. Then, the call process unit 122 performs processing of changing the communication state as determined above.

Note that, the call process unit 122 may perform the foregoing processing of changing the communication state for all the mobile stations which are performing the communication in the cell 50, or only for some of the mobile stations which are performing the communication for a period longer than a predetermined period. For example, the call process unit 122 may perform the foregoing processing of changing the communication state only for the mobile stations which are performing the communication for the first and second longest period.

Figure 9:
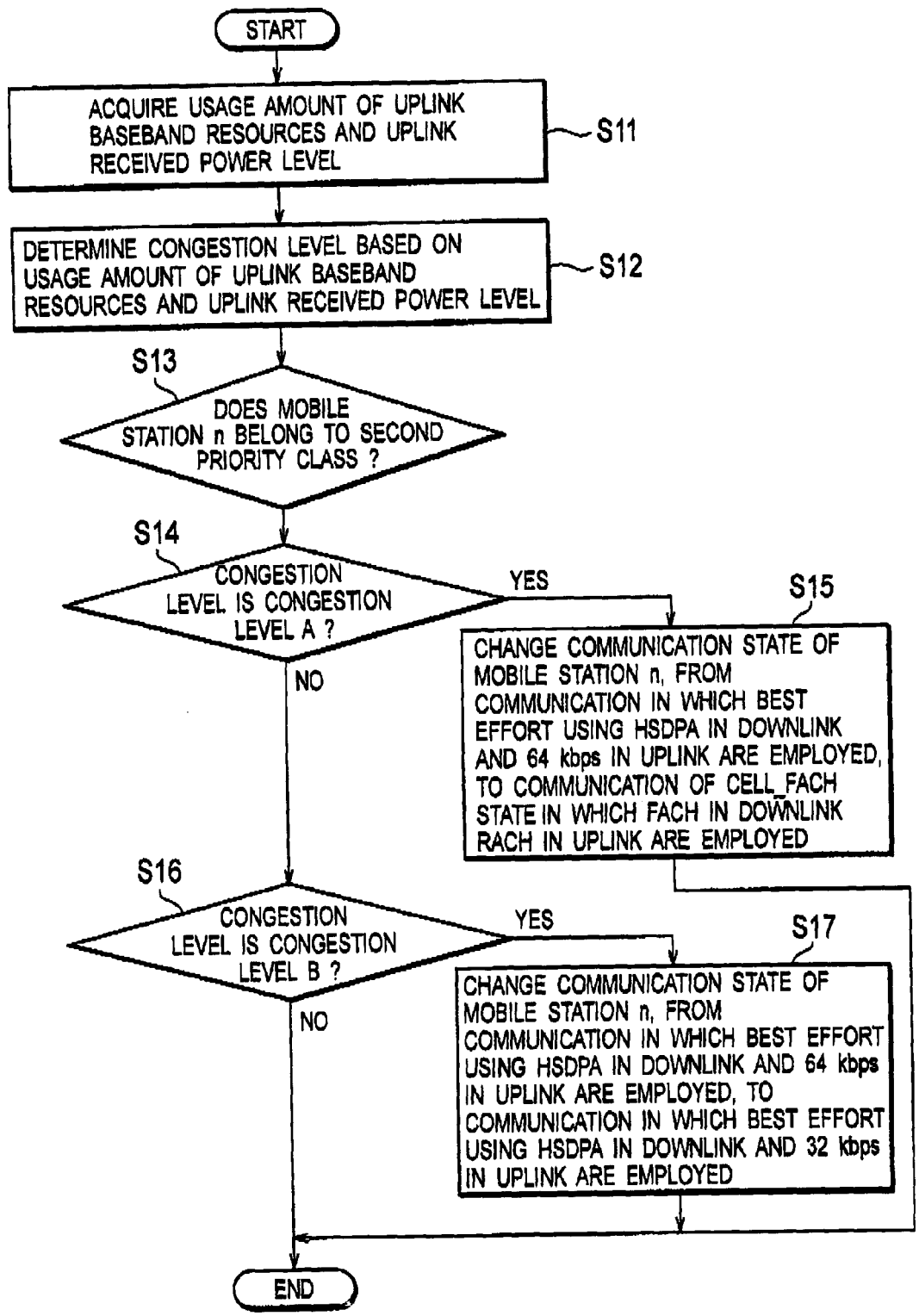
FIG. 9 is a flowchart of communication controlling operations for changing a communication state in consideration of the priority class of a mobile station n according to the congestion level in this embodiment.

FIG. 9 shows processing in a case where the foregoing processing of changing the communication state is performed according to the priority class of the mobile station n. In the following example, there are mobile stations belonging to the first priority class and mobile stations belonging to the second priority class in the mobile communication system 1000. Further, the mobile stations belonging to the first priority class has a higher priority than the mobile stations belonging to the second priority class. Here, the communication controlling method according to the present invention is supposed to be applied only to the mobile stations belonging to the second priority class.

As shown in FIG. 9, in step S11, the layer 1 process unit 111 and the UL resource monitoring unit 114 in the base station 30 firstly acquire the usage amount of uplink baseband resources and the uplink received power level.

Subsequently, in step S12, the congestion level determination unit 121 in the radio network controller 40 determines the congestion level based on the usage amount of uplink baseband resources and the uplink received power level.

Thereafter, in step S13, the call process unit 122 in the radio network controller 40 determines whether or not the mobile station n belongs to the second priority class. When it is determined that the mobile station n belongs to the second priority class, the operation moves to step S14. When it is determined that the mobile station n does not belong to the second priority class, the operation are terminated.

In step S14, the call process unit 122 determines whether or not the congestion level is the congestion level A. When it is determined that the congestion level is the congestion level A, the operation moves to step S15. When it is determined that the congestion level is not the congestion level A, the operation moves to step S16.

In step S15, the call process unit 122 determines to change the communication state of the mobile station n from the communication in which best effort using HSDPA in the downlink and 64 kbps in the uplink are employed, to the communication of the CELL_FACH state in which FACH in the downlink and BACH in the uplink are employed, that is, the call process unit 122 may determine to change to the state in which the communication is performed by the decreased transmission rate. Then, the call process unit 122 performs processing of changing the communication state as determined above. Here, according to the change of the communication state in step S15, both uplink transmission rate and downlink transmission rate are decreased.

In step S16, the call process unit 122 determines whether or not the congestion level is the congestion level B. When it is determined that the congestion level is the congestion level B, the operation moves to step S17. When it is determined that the congestion level is not the congestion level B, the operation are terminated.

In step S17, the call process unit 122 determines to change the communication state of the mobile station n from the communication in which best effort using HSDPA in the downlink and 64 kbps in the uplink are employed, to the communication in which best effort using HSDPA in the downlink and 32 kbps in the uplink are employed, that is, the call process unit 122 may determine to decrease the uplink transmission rate. Then, the call process unit 122 performs processing of changing the communication state as determined above.

Incidentally, the foregoing processing of changing the communication state may be performed for all the mobile stations which are performing the communication in the cell 50 and belonging to the second priority class, or only for some of the mobile stations which are performing the communication for a period longer than a predetermined period. For example, the call process unit 122 may perform the foregoing processing of changing the communication state only for the mobile stations which are performing the communication for the first and second longest period.

The foregoing example shows the operation of communication control for changing the communication state of the mobile station n according to the congestion level and the priority class. It is also possible to perform the operation of communication control according to the contract type, service type, terminal type, terminal identifier of the mobile station n, instead of the priority class of the mobile station n.

Hereinafter, by use of a flowchart shown in FIG. 10, descriptions will be provided for an operation of communication control for keeping the communication state unchanged according to the congestion level in the communication controlling method according to this embodiment.

Figure 10:
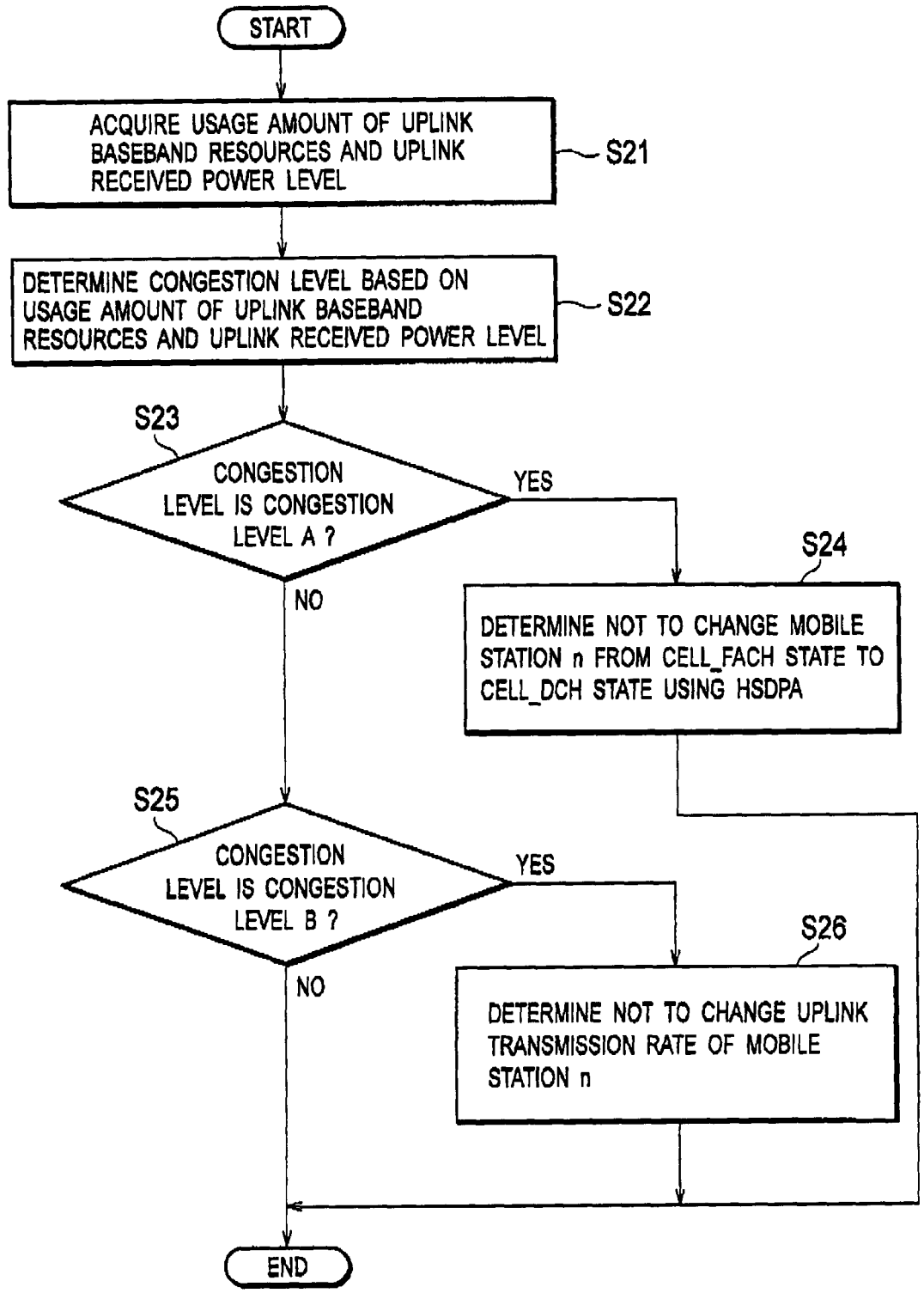
FIG. 10 is a flowchart of communication controlling operations for keeping a communication state unchanged according to the congestion level in this embodiment.

As shown in FIG. 10, in step S21, the layer 1 process unit 111 and the UL resource monitoring unit 114 in the base station 30 acquire the usage amount of uplink baseband resources and the uplink received power level.

Then, in step S22, the congestion level determination unit 121 in the radio network controller 40 determines the congestion level based on the usage amount of uplink baseband resources and the uplink received power level.

Next, in step S23, the call process unit 122 in the radio network controller 40 determines whether or not the congestion level is the congestion level A. When it is determined that the congestion level is the congestion level A, the operation moves to step S24. When it is determined that the congestion level is not the congestion level A, the operation moves to step S25.

In step S24, the call process unit 122 determines to keep the communication state of the mobile station n without changing from the CELL_FACH state to the CELL_DCH state using HSDPA, even though the communication state of the mobile station n is changed from the CELL_FACH state to the CELL_DCH state using HSDPA when under normal state (when not under the congestion state).

In step S25, the call process unit 122 determines whether or not the congestion level is the congestion level B. When it is determined that the congestion level is the congestion level B, the operation moves to step S26. When it is determined that the congestion level is not the congestion level B, the operation are terminated.

In step S26, the call process unit 122 determines to keep the transmission rate in the uplink unchanged, even though the transmission rate in the uplink is changed when under normal state (when not under the congestion state). Here, for example, a change of the transmission rate in the uplink is a change of the transmission rate from 32 kbps to 64 kbps, that is, the call process unit 122 may determine to increase the uplink transmission rate.

The call process unit 122 may perform the foregoing processing of changing the communication states for all the mobile stations which are performing the communication in the cell 50, or only for some of the mobile stations which are performing the communication for a period longer than a predetermined period. For example, the call process unit 122 may perform the foregoing processing of changing the communication state only for the mobile stations which are performing the communication for the first and second longest period.

Figure 11:
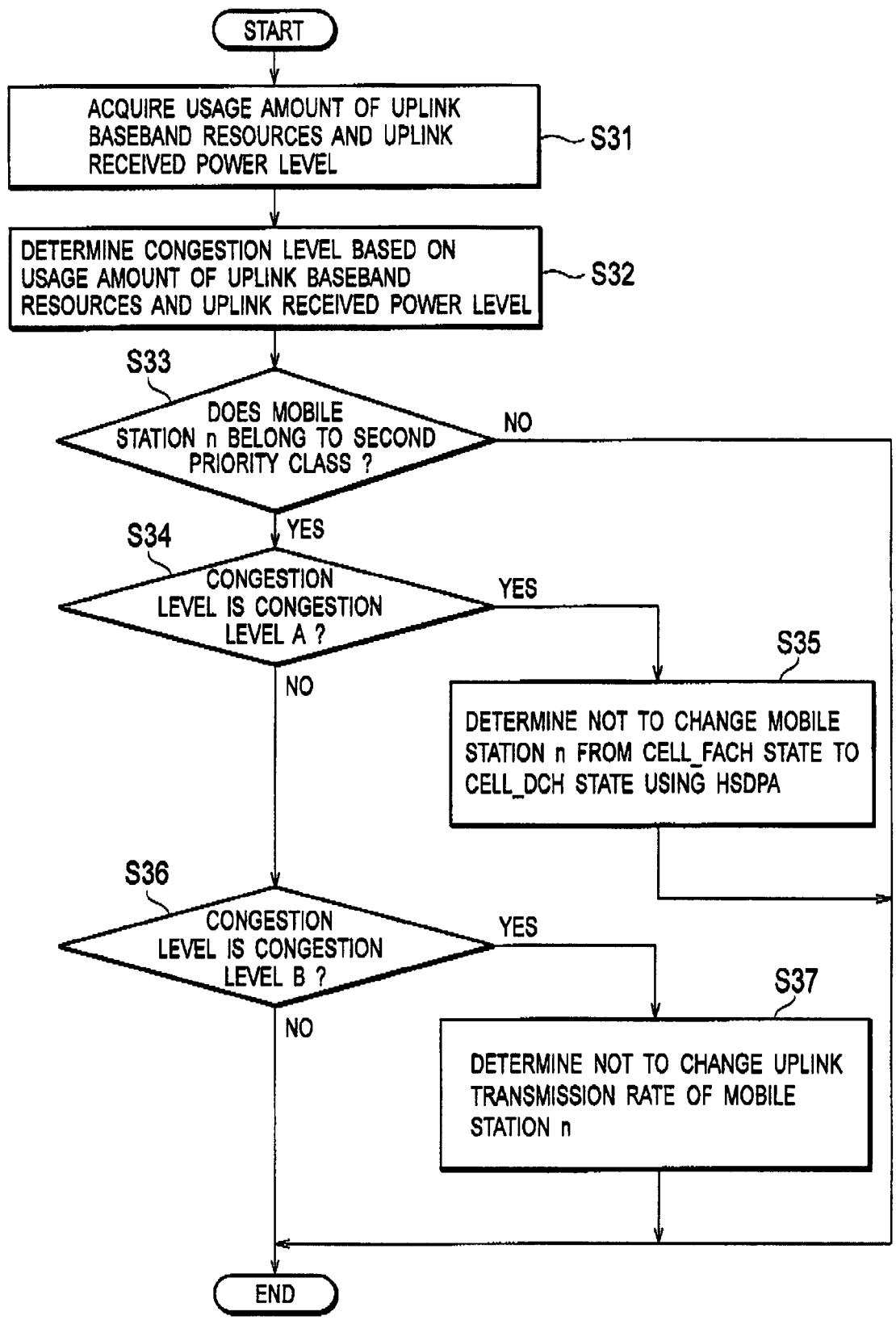
FIG. 11 is a flowchart of communication controlling operations for keeping a communication state unchanged in consideration of the priority class of a mobile station n according to the congestion level in this embodiment.

FIG. 11 shows processing in a case where the foregoing operation of keeping the communication state unchanged is performed according to the priority class of the mobile station n. In the following example, there are mobile stations belonging to the first priority class and mobile stations belonging to the second priority class in the mobile communication system 1000. Further, the mobile stations belonging to the first priority class has a higher priority than the mobile stations belonging to the second priority class. Here, the communication controlling method according to the present invention is supposed to be applied only to the mobile stations belonging to the second priority class.

As shown in FIG. 11, in step S31, the layer 1 process unit 111 and the UL resource monitoring unit 114 in the base station 30 firstly acquire the usage amount of uplink baseband resources and the uplink received power level.

Subsequently, in step S32, the congestion level determination unit 121 in the radio network controller 40 determines the congestion level based on the usage amount of uplink baseband resources and the uplink received power level.

Thereafter, in step S33, the call process unit 122 in the radio network controller 40 determines whether or not the mobile station n belongs to the second priority class. When determining that the mobile station n belongs to the second priority class, the operation moves to step S34. When it is determined that the mobile station n does not belong to the second priority class, the operation are terminated.

In step S34, the call process unit 122 determines whether or not the congestion level is the congestion level A. When it is determined that the congestion level is the congestion level A, the operation moves to step S35. When it is determined that the congestion level is not the congestion level A, the operation move to step S36.

In step S35, the call process unit 122 determines to keep the communication state of the mobile station n without changing from the CELL_FACH state to the CELL_DCH state using HSDPA, even though the communication state of the mobile station n is changed from the CELL_FACH state to the CELL_DCH state using HSDPA when under normal state (when not under the congestion state).

In step S36, the call process unit 122 determines whether or not the congestion level is the congestion level B. When it is determined that the congestion level is the congestion level B, the operation moves to step S37. When it is determined that the congestion level is not the congestion level B, the operation are terminated.

In step S37, the call process unit 122 determines to keep the transmission rate in the uplink unchanged, even though the transmission rate in the uplink is changed when under normal state (when not under the congestion state). Here, for example, a change of the transmission rate in the uplink is a change of the transmission rate from 32 kbps to 64 kbps, that is, the call process unit 122 may determine to increase the uplink transmission rate.

The call process unit 122 may perform the foregoing processing of keeping the communication states unchanged for all the mobile stations which are the communication in the cell 50 and belonging to the second priority class, or only for some of the mobile stations which are performing the communication for a period longer than a predetermined period. For example, the call process unit 122 may perform the foregoing processing of keeping the communication state unchanged only for the mobile stations which are performing the communication for the first and second longest period.

The foregoing example shows the operation of the communication control for keeping the communication state of the mobile station n unchanged according to the congestion level and the priority class. It is also possible to perform the operation of the communication control according to the contract type, service type, terminal type, terminal identifier of the mobile station n, instead of the priority class of the mobile station n.

Hereinafter, by use of a flowchart shown in FIG. 12, descriptions will be provided for an operation of communication control for determining, according to the congestion level, whether or not to admit the mobile station 20 to newly start a communication, in the communication controlling method according to this embodiment.

Figure 12:
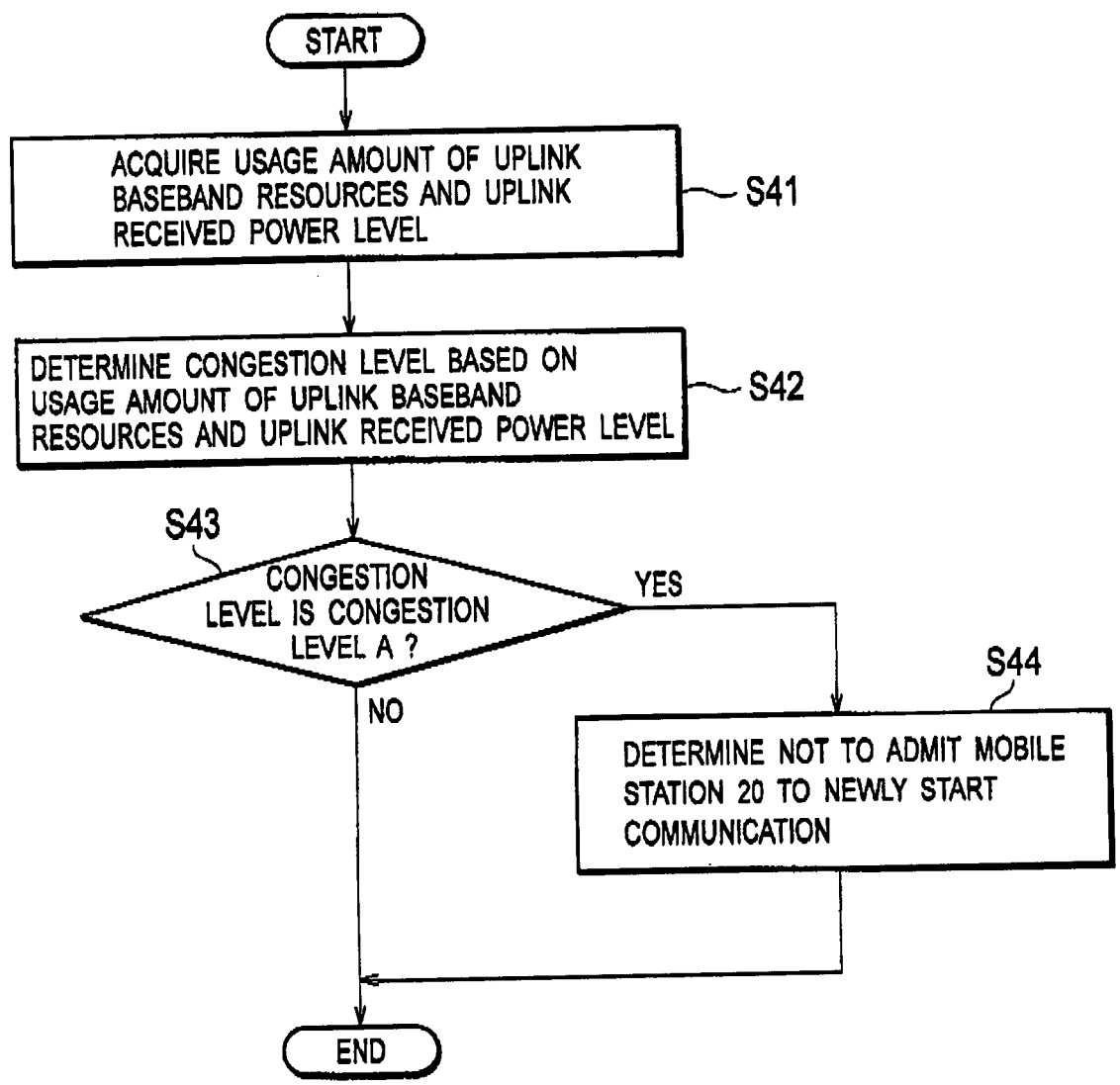
FIG. 12 is a flowchart of communication controlling operations for determining whether or not to admit to newly start a communication, according to the congestion level in this embodiment.

As shown in FIG. 12, in step S41, the layer 1 process unit 111 and the UL resource monitoring unit 114 in the base station 30 acquire the usage amount of uplink baseband resources and the uplink received power level.

Subsequently, in step S42, the congestion level determination unit 121 in the radio network controller 40 determines the congestion level based on the usage amount of uplink baseband resources and the uplink received power level.

Next, in step S43, the call process unit 122 in the radio network controller 40 determines whether or not the congestion level is the congestion level A. When it is determined that the congestion level is the congestion level A, the operation moves to step S44. When it is determined that the congestion level is not the congestion level A, the operation is terminated.

In step S44, the call admission control unit 123 determines not to allow the mobile station 20 to newly start the communication, that is, not to admit the mobile station 20 to newly start a communication. In this case, for example, the call admission control unit 123 may perform the processing for starting a communication using a dedicated channel in the downlink, instead of performing the processing for starting the communication using HSDPA in the downlink.

Alternatively, the call admission control unit 123 may notify the mobile station 20 of the information that the mobile station 20 is not allowed to start the communication using HSDPA, instead of performing the processing for starting the communication using HSDPA in the downlink. In this case, the communication that the mobile station 20 is about to start becomes a call loss.

Figure 13:
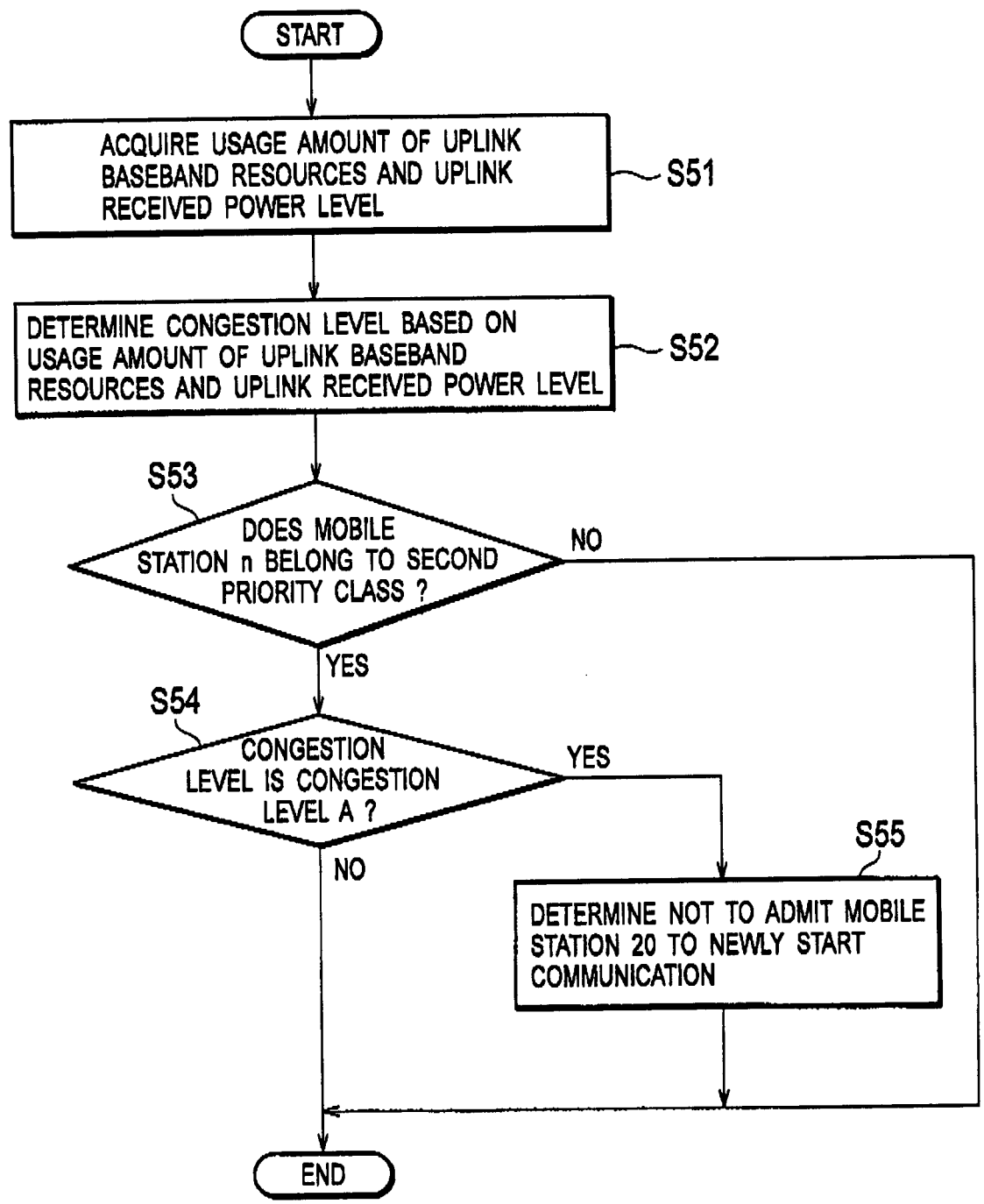
FIG. 13 is a flowchart of communication controlling operations for determining whether or not to admit to newly start a communication, according to the congestion level and the priority class of the mobile station in this embodiment.

FIG. 13 shows an operation of communication control in a case where the foregoing processing, in which the mobile communication system 1000 determines whether or not to admit to newly start a communication, is performed according to the priority class of the mobile station 20. In the following example, there are mobile stations belonging to the first priority class and mobile stations belonging to the second priority class in the mobile communication system 1000. Further, the mobile stations belonging to the first priority class has a higher priority than the mobile stations belonging to the second priority class. The communication controlling method according to the present invention is supposed to be applied only to the mobile stations belonging to the second priority class.

As shown in FIG. 13, in step S51, the layer 1 process unit 111 and the UL resource monitoring unit 114 in the base station 30 acquire the usage amount of uplink baseband resources and the uplink received power level.

Then, in step S52, the congestion level determination unit 121 in the radio network controller 40 determines the congestion level based on the usage amount of uplink baseband resources and the uplink received power level.

Next, in step S53, the call process unit 122 determines whether or not the mobile station n belongs to the second priority class. When it is determined that the mobile station n belongs to the second priority class, the operation moves to step S54. When it is determined that the mobile station n does not belong to the second priority class, the operation is terminated.

In step S54, the call process unit 122 determines whether or not the congestion level is the congestion level A. When it is determined that the congestion level is the congestion level A, the operation moves to step S55. When it is determined that the congestion level is not the congestion level A, the operation is terminated.

In step S55, the call process unit 122 determines not to allow the mobile station 20 to newly start a communication, that is, not to admit the mobile station 20 to newly start a communication. In this case, for example, the call admission control unit 123 may perform the processing for starting the communication using a dedicated channel in the downlink, instead of performing the processing for starting the communication using HSDPA in the downlink.

Alternatively, the call admission control unit 123 may notify the mobile station 20 of the information that the mobile station 20 is not allowed to newly start the communication using HSDPA, instead of performing the processing for starting the communication using HSDPA in the downlink. In this case, the communication that the mobile station 20 is about to start becomes a call loss.

The foregoing example shows the operation of the communication controlling operation for changing the communication state of the mobile station n according to the congestion level and the priority class. It is also possible to perform the communication controlling operations according to the contract type, service type, terminal type, and terminal identifier of the mobile station n, instead of the priority class of the mobile station n.

(Effects)

According to the mobile communication system 1000 of this embodiment having been described above, whether or not to change the communication state and whether or not to admit to newly start a communication can be controlled according to the congestion state (or the congestion level in an uplink, and accordingly mobile communication services can be appropriately provided.

Moreover, according to the mobile communication system 1000 of this embodiment, whether or not to change the communication state and whether or not to admit to newly start a communication are controlled according to the priority classes, service types, contract types and the like. Thereby, the communication quality can be controlled for each of the priority classes, service types and contract types of mobile stations. Thus, more appropriate mobile communication services can be provided.

OTHER EMBODIMENTS

Although the present invention has been described by using the above embodiment, it should not be understood that the present invention is limited to the descriptions and drawings constituting part of this disclosure. From this disclosure, various alternative embodiments, examples and applied techniques should be obvious to those skilled in the art.

For example, the above embodiment has been described as a case where the high-speed packet transmission scheme HSDPA in 3GPP is applied to the downlink. However, the present invention is not limited to the above example, and is applicable to other types of mobile communication systems.

For example, the present invention is applicable to a mobile communication system having uplink employing the high-speed uplink packet transmission scheme HSUPA (high speed uplink packet access, or called Enhanced Uplink) in 3GPP.

Furthermore, other applicable high-speed packet transmission schemes include the high-speed packet transmission scheme provided by 3GPP Long Term Evolution, cdma2000 1xEV-DO of 3GPP2, the high-speed packet transmission scheme of the TDD scheme, and the like.

In the above embodiment, the configuration of the radio network controller 40 has been described as one including the controllers (the congestion level determination unit 121, the call process unit 122 and the call admission control unit 123) of classifying the current congestion state of the uplink into a plurality of congestion levels, and of controlling the communication state between the base station and the mobile station for each of the plurality of congestion levels. These controllers, however, may be included in the base station 30.

As described above, it is obvious that the present invention encompasses various other embodiments which are not expressly described herein. Accordingly, the technical scope of the present invention shall be defined only by the matters to define the invention according to the appended claims which are reasonably understood from the description of this disclosure.

What is claimed is:

1. A mobile communication system which includes a base station, a mobile station for performing a communication with the base station, and a radio network controller for controlling the communication between the base station and the mobile station, comprising:
    a congestion level determination unit configured to determine a congestion level of a congestion state of an uplink based on at least one of a usage amount of uplink baseband resources and an uplink received power level; and
    a controller configured to control a communication state of the communication between the base station and the mobile station according to the determined congestion level of the congestion state of the uplink wherein
    the controlling of the communication state between the base station and the mobile station includes changing at least one of an uplink transmission rate and a downlink transmission rate, and
    the congestion level determination unit determines the congestion level by selecting one of a higher or lower congestion level than the determined congestion level based on the usage amount of uplink baseband resources and the uplink received power level.

2. The mobile communication system according to claim 1, wherein the controller is configured to classify the congestion state of the uplink into a plurality of congestion levels, and to control the communication state between the base station and the mobile station for each of the plurality of congestion levels.

3. The mobile communication system according to claim 1, wherein the congestion level determination unit is configured to determine the congestion level of the congestion state of the uplink based on the usage amount of the uplink baseband resources and the uplink received power level.

4. The mobile communication system according to claim 1, wherein the controlling of the communication state between the base station and the mobile station includes setting the communication state between the base station and the mobile station to at least one of an idle state, an active state, a cell_fach state, a cell_dch state, a common channel state, a dedicated channel state and a high-speed shared channel state.

5. The mobile communication system according to claim 1, wherein the controlling the communication state between the base station and the mobile station includes keeping the communication state between the base station and the mobile station unchanged, when the communication state between the base station and the mobile station is any one of an idle state, an active state, a cell_fach state, a cell_dch state, a common channel state, a dedicated channel state and a high-speed shared channel state.

6. The mobile communication system according to claim 1, wherein the controlling of the communication state between the base station and the mobile station includes controlling whether or not to admit to newly start a communication between the base station and the mobile station.

7. The mobile communication system according to claim 1, wherein the base station and the mobile station perform the communication with each other in a downlink by using a high speed downlink packet access.

8. The mobile communication system according to claim 1, wherein the base station and the mobile station perform the communication with each other in the uplink by using any one of a high speed uplink packet access and an enhanced uplink.

9. The mobile communication system according to claim 1, wherein the controller is configured to control the communication state according to any of a priority class, a service type, a contract type, a terminal type and a user identifier.

10. The mobile communication system according to claim 1, wherein the controller is configured to control the communication state of the mobile station which has been performing the communication for a period longer than a certain threshold.

11. A communication controlling method in a mobile communication system which includes of a base station, a mobile station for performing a communication with the base station, and a radio network controller for controlling the communication between the base station and the mobile station, comprising:
    determining a congestion level of a congestion state of an uplink based on at least one of a usage amount of uplink baseband resources and an uplink power level; and
    controlling a communication state of the communication between the base station and the mobile station according to the determined congestion level of the congestion state of the uplink, wherein the controlling of the communication state between the base station and the mobile station includes changing at least one of an uplink transmission rate and a downlink transmission rate, and determining the congestion level includes determining the congestion level by selecting one of a higher or lower congestion level than the determined congestion level based on the usage amount of uplink baseband resources and the uplink received power level.

\* \* \* \* \*